US011193824B2

(12) United States Patent
Liang

(10) Patent No.: US 11,193,824 B2
(45) Date of Patent: Dec. 7, 2021

(54) COMPACT SPECTROMETER DEVICES, METHODS, AND APPLICATIONS

(71) Applicant: Arizona Board of Regents on Behalf of the University of Arizona, Tucson, AZ (US)

(72) Inventor: Rongguang Liang, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/647,405

(22) PCT Filed: Sep. 14, 2018

(86) PCT No.: PCT/US2018/051061
§ 371 (c)(1),
(2) Date: Mar. 13, 2020

(87) PCT Pub. No.: WO2019/055771
PCT Pub. Date: Mar. 21, 2019

(65) Prior Publication Data
US 2020/0271518 A1 Aug. 27, 2020

Related U.S. Application Data

(60) Provisional application No. 62/558,627, filed on Sep. 14, 2017.

(51) Int. Cl.
*G01B 9/02* (2006.01)
*G01J 3/28* (2006.01)
*G01J 3/02* (2006.01)

(52) U.S. Cl.
CPC ........... *G01J 3/2823* (2013.01); *G01J 3/0208* (2013.01); *G01J 3/0291* (2013.01); *G01J 2003/2826* (2013.01)

(58) Field of Classification Search
CPC ...... G01J 3/2823; G01J 3/0208; G01J 3/0291; G01J 3/0229; G01J 3/0256; G01J 2003/2826
See application file for complete search history.

(56) References Cited

U.S. PATENT DOCUMENTS 5,276,321 A   1/1994  Chang et al.
6,522,402 B1  2/2003  Wang et al.
(Continued)

FOREIGN PATENT DOCUMENTS

WO   2016125165 A2   8/2016

OTHER PUBLICATIONS

Flanigan, D., "Vapor-detection sensitivity as a function of speclial resolution for a single Lorentzian band," Applied Optics, vol. 34, No. 15, pp. 2636-2639, 1995.
(Continued)

*Primary Examiner* — Tarifur R Chowdhury
*Assistant Examiner* — Jonathon Cook
(74) *Attorney, Agent, or Firm* — Perkins Coie LLP

(57) ABSTRACT

Methods, devices and systems provide improved spectral imaging and detection and can be implemented as compact, light-weight and low-cost devices. An example device includes a mask that includes a plurality of apertures and positioned to receive light from an object of interest. A first lenslet array is positioned to receive light that passes through the plurality of apertures. Each lenslet of the first lenslet array receives the light from a corresponding aperture and produces collimated light that is incident on a dispersive element, such as a diffraction grating or a prism, which produces a plurality of spectrally separated components. A second lenslet array receives the spectrally separated components and focuses each of the spectrally separated components onto an image plane, where a sensor is located. The
(Continued)

information obtained from the sensor can be used to determine or analyze spectral characteristics of the object, which can be in gaseous form.

26 Claims, 6 Drawing Sheets

(56) References Cited

U.S. PATENT DOCUMENTS

| | | | |
|---|---|---|---|
| 2006/0072109 A1* | 4/2006 | Bodkin | G01J 3/0286 356/328 |
| 2008/0291445 A1 | 11/2008 | Iwane | |
| 2010/0253941 A1* | 10/2010 | Brady | G01J 3/0208 356/310 |
| 2013/0229646 A1 | 9/2013 | Sakurai | |
| 2015/0316473 A1 | 11/2015 | Kester et al. | |
| 2017/0219426 A1 | 8/2017 | Pacala et al. | |

OTHER PUBLICATIONS

Flanigan, D., "Prediction of the limits of detection of hazardous vapors by passive infrared with the use of MODTRAN," Applied Optics, vol. 35, No. 30, pp. 6090-6098, 1996.

Polak, M., et al., "Passive Fourier-transform infrared spectroscopy of chemical plumes: An algorithm for quantitative interpretation and real-time background removal," Applied Optics, vol. 34, No. 24, pp. 5406-5412, 1995.

Hayden, A., et al., "Determination of trace-gas amounts in plumes by the use of orthogonal digital filtering of thermal-emission spectra," Applied Optics, vol. 35, No. 16, pp. 2802-2809, 1996.

International Search Report and Written Opinion, dated Jan. 8, 2019, for International Patent Application No. PCT/US2018/051061, filed Sep. 14, 2018 (9 pages).

* cited by examiner

COMPACT SPECTROMETER DEVICES, METHODS, AND APPLICATIONS

CROSS REFERENCE TO RELATED APPLICATIONS

This patent document is a 371 National Phase Application of International Patent Application No. PCT/US2018/051061, filed Sep. 14, 2018, which claims priority to the provisional application with Ser. No. 62/558,627, titled "Compact Spectrometer Apparatus, Method, and Applications," filed Sep. 14, 2017. The entire contents of the above noted applications are incorporated by reference as part of the disclosure of this document.

TECHNICAL FIELD

The subject matter of this patent document generally relates to spectral imaging and detection systems, and more particularly to systems, devices and methods for hyperspectral imaging and object detection.

BACKGROUND

Hyperspectral imaging collects and processes spectral information for each pixel in the image of a scene, with the purpose of finding objects, identifying materials, or detecting processes. In hyperspectral imaging, the recorded spectra typically include many spectral bands that provide fine wavelength resolution and cover a wide range of wavelengths. Hyperspectral imaging also measures contiguous spectral bands, compared to multispectral imaging which measures spaced spectral bands. Due to the limitation on available pixels in a digital sensor, there is a trade-off between the spectral resolution and spatial resolution. The disclosed embodiments, among other features and benefits, provide improved spectral imaging methods and devices for detection and sensing that utilize light sources.

SUMMARY OF CERTAIN EMBODIMENTS

Figure 1:
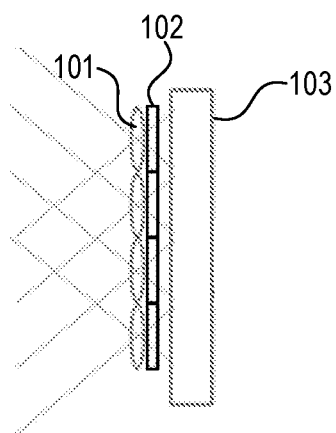
FIG. 1 illustrates a prior art spectra imaging system.

The disclosed embodiments relate to systems and methods that utilize a low-cost and light-weight spectral imaging system to produce spectral images at high resolution and with high light efficiency.

One aspect of the disclosed embodiments relates to a spectral imaging system that includes a mask that includes a plurality of apertures and positioned to receive light from an object of interest, and a first lenslet array positioned to receive light that passes through the plurality of apertures. Each lenslet of the first lenslet array is positioned to receive light from a corresponding aperture of the plurality of apertures and to produce collimated light. The spectral imaging system also includes a dispersive optical element positioned to receive the collimated light from each lenslet of the first lenslet array and to produce light having a plurality of spectrally separated components, as well as a second lenslet array positioned to receive the light having the plurality of spectrally separated components and to focus each of the spectrally separated components onto an image plane.

In one exemplary embodiment, each of the plurality of apertures is a pinhole configured to spatially sample the light that is received from the object of interest. In an exemplary embodiment, a diameter of each pinhole is in a range 5 to 10 µm. In another exemplary embodiment, the mask is positioned at a focal plane of the first lenslet array. In still another exemplary embodiment, the mask is positioned with respect to the first lenslet array such that each aperture in the mask is laterally offset from a center of a corresponding lenslet in the first lenslet array to cause the collimated light that exits each lenslet of the first lenslet array to impinge upon the dispersive optical element at an oblique angle of incidence. In yet another exemplary embodiment, the mask is positioned to produce the oblique angle of incidence on the optical dispersive element in such a way that the light having the plurality of spectrally separated components that is output from the dispersive optical element is symmetrically distributed along an optical axis of each lenslet of the second lenslet array.

According to an exemplary embodiment, the dispersive optical element comprises a diffraction grating. In another exemplary embodiment, the dispersive optical element comprises an array of prisms. In another exemplary embodiment, the spectral imaging system includes a sensor positioned at the image plane to receive the spectrally separated components. In one exemplary embodiment, the sensor includes a plurality of pixels, and each of the spectrally separated components is focused onto at least one pixel of the sensor. In yet another exemplary embodiment, the spectral imaging system includes a telecentric lens positioned to receive light from the object of interest and to produce an image plane of the telecentric lens at the mask.

In one exemplary embodiment, a thickness of the spectral imaging system including the mask, the first lenslet array, the dispersive optical element and the second lenslet array along an optical axis of the spectral imaging system is less than 10 mm. In another exemplary embodiment, a number of lenslets in the first lenslet array, a number of lenslets in the second lenslet array, and the number of apertures in the mask are all equal to one another. In still another exemplary embodiment, the first lenslet array and the dispersive optical element form a single element. In another exemplary embodiment, the dispersive optical element and second lenslet array form a single element. In yet another exemplary embodiment, the mask, the first lenslet array, the dispersive optical element and the second lenslet array form a single element, comprising the mask on a first surface of the single element, the second lenslet array on a second surface of the single element, and the first lenslet array and the dispersive optical element positioned internal to the single element.

In another exemplary embodiment, the dispersive optical element is configured to produce the light having a plurality of spectrally separated components that form a contiguous band of wavelengths. In one exemplary embodiment, the spectral imaging system is a hyperspectral imaging system. In another exemplary embodiment, the spectral imaging system is configured as a snapshot imaging system. In still another exemplary embodiment, the object of interest is in a gaseous form.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Hyperspectral imaging has important benefits and applications in biomedical imaging, remote sensing, and material identification. It is capable of recording a full four-dimensional (i.e., two spatial dimensions, a spectral dimension, and a time dimension) hyperspectral datacube, which is ideal for recording data on transient events. As one example, hyperspectral imaging has been widely used in detecting chemical agents and toxic industrial chemicals (TICs). TICs represent a major threat to public health and security. They can be insidious weapons since they are generally colorless and odorless, making them very difficult to detect by conventional means. Chemical warfare is a problem of growing concern for defense. Detection of gaseous objects differs greatly from detection of hard targets since the plume modifies the spectral signature of the background according to its emission or absorption spectrum. Standoff detection of gaseous plumes by remote infrared (IR) technology utilizes the unique spectral absorption spectra that characterize a wide range of molecules in the vapor phase.

There are generally two approaches to obtain spectral images: sequential imaging and snapshot imaging. Sequential spectral imaging captures spectral images over time and is generally accomplished by either changing the illumination spectrum or capturing the scene with spectrum selection elements, such as bandpass filters. The key advantage of sequential imaging is its high spatial resolution, with the sacrifice of time resolution. The spectral resolution is determined by the illumination spectrum and/or spectrum selection elements. Snapshot imaging provides instantaneous imaging of a scene and has the advantage of providing instant imaging, which enables real-time applications. Snapshot hyperspectral imaging is preferred for many real-time imaging applications.

In the past few decades, a number of snapshot imaging techniques have been developed, such as computed tomography imaging spectrometry (CTIS), coded aperture snapshot spectral imaging (CASSI), multi-aperture filtered camera (MAFC), image mapping spectrometry (IMS), snapshot hyperspectral imaging Fourier transform (SHIFT) spectrometry, and multispectral Sagnac interferometry (MSI). The common issue with the available hyperspectral imaging techniques is that the systems are bulky and comparatively expensive.

Other reported spectral imaging systems are based on lenslet and filter arrays, as, for example, shown in FIG. 1. Light from the object of interest is received by lenslet array 101 and is focused on a sensor 103 after passing through the spectral filters 102. Each spectral filter is aligned with one lenslet and allows a particular range of light (e.g., red, yellow, green and blue) to pass. Therefore, the detected light on the sensor corresponds to different spectral components of the light. One major disadvantage of this system is that the aperture for each lenslet is too small to transmit sufficient light from the remote sensing region. Another limitation is that the spectral resolution provided by such a system is low, as determined by the number of filters.

The disclosed embodiments describe optical hyperspectral imaging methods and associated devices that are ultra-compact and lightweight (sometimes referred to as a microspectrometer), and can provide snapshot, hyperspectral spectrometry with high spectral and spatial resolution. The disclosed devices in various embodiments are comparatively low-cost, are highly robust and versatile, and enable snapshot (single shot) spectral imaging that is insensitive to the motion of the source.

Figure 2:
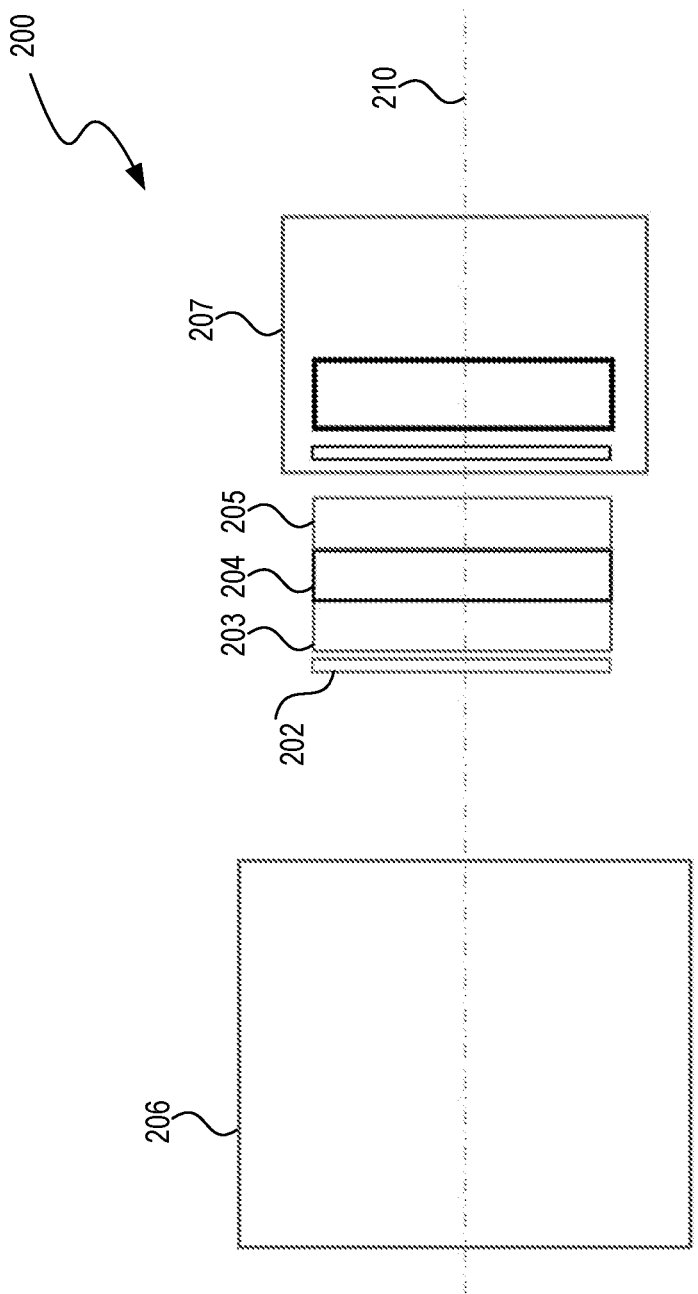
FIG. 2 illustrates a spectral imaging system in accordance with an exemplary embodiment.

FIG. 2 illustrates a schematic diagram of a spectral imaging system 200 in accordance with an exemplary embodiment. System 200 includes a mask 202, a first lenslet array 203, a spectrally dispersive element 204, such as a diffraction grating or a prism, disposed along the optical axis 210, and a second lenslet array 205. In some embodiments, the mask 202 advantageously comprises a flat, optically non-transmissive surface with an m-by-n array of pinhole apertures (where m and n are integers that denote the number of rows and columns of pinholes, respectively). An exemplary mask may include an array of 100×100 apertures with aperture diameters in the range 5-10 μm.

In some embodiments, the spectral imaging system 200 also includes a telecentric lens 206 that receives light from the object or target of interest, and provides a distance/magnification-invariant intermediate image of the object of interest at the mask 202 plane. The pinholes in the mask 202 sample the object in the image plane of the telecentric lens 206. The sampling density is determined by the desired spectral resolution and working spectral range. In embodiments where the number of pixels in the sensor 207 is fixed, the higher the spectral resolution or the larger the working spectral range, the lower the sampling density. It should be noted that in some embodiments, other lenses or imaging/relay systems be used in place of the telecentric lens 206.

Referring to FIG. 2, the first lenslet array 203 is disposed on the image side (right-hand side) of the mask 202 to receive the light that passes through the mask 202 and to collimate the spatially sampled object field transmitted by each pinhole of the mask 202. In some embodiments, the first lenslet array 203 has dimensions that are similar to those in the mask 202 and the lenslet pitch (i.e., center-to-center spacing of lenslets) in the first lenslet array 203 is the same as that of the pitch in the pinhole array on the mask 202. The first lenslet array 203 and the mask 202 should be well-aligned so that the light from the pinholes on the mask 202 is collimated after exiting the first lenslet array 203. A spectrally dispersive element 204, such as a prism or a diffraction grating, is disposed on the image side (right-hand side) of the first lenslet array 203 to receive the light that exits the first lenslet array 203 and to spectrally separate the spatially sampled light as it exits the dispersive element 204. A second lenslet array 205 is disposed on the image side of the spectrally dispersive element 204 and focuses the spectrally sampled object field onto the sensor 207. The pitch of the second lenslet array 205, in some embodiments, is the same as the pitch of the first lenslet array 203. The sensor in one exemplary embodiment is a pixelated CMOS sensor.

Figure 3:
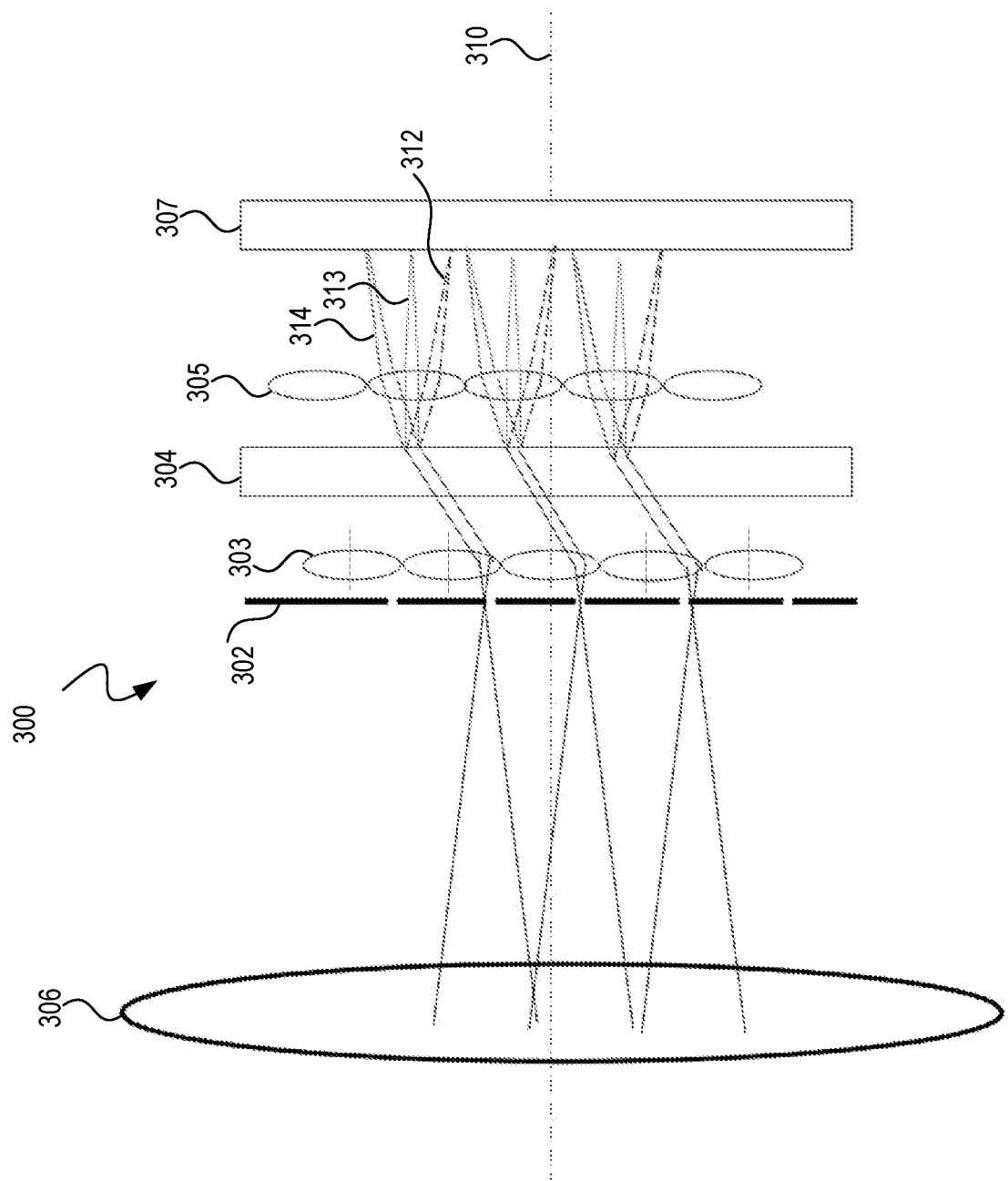
FIG. 3 illustrates a detailed view of spectral imaging system including a pinhole mask, two lenslet arrays and a diffraction grating in accordance with an exemplary embodiment.

FIG. 3 illustrates a specific embodiment of the disclosed technology that shows the positioning of a pinhole mask 302 and certain optical rays that traverse a spectral imaging system 300. The light that passes through the telecentric lens 306 is spatially sampled by the mask 302 that is formed as an array of pinholes. The first lenslet array 303 is positioned on the optical axis 310 to receive and collimate the rays after they exit the mask 202. Thus, the mask 302 is positioned at the focal plane of the first lenslet array 203. A diffraction grating 304 receives the light from the first lenslet array 303, and produces a spectrally dispersed light. A second lenslet array 305 receives the light from the diffraction grating 304, and focuses each spectral component of the spectrally dispersed light on one or more pixels of the sensor 307.

As illustrated in FIG. 3, each pinhole location on the mask 302 is shifted with respect to the center of the corresponding lenslet of the first lenslet array 303. As a result, the collimated light that is produced by each lenslet impinges on the grating 304 at an oblique (e.g., inclined) angle. By adjusting the amount of lateral shift between the pinhole locations relative to the lenslets of the first lenslet array 303, the angle of incidence on the grating 304 can be changed. In some embodiments, the lateral shift is selected to provide an angle of incidence on the grating 304 that produces a symmetrically dispersed light along the optical axis (e.g., the optical axis of each lenslet of the second lenslet array) that is incident on the sensor 307. For example, as illustrated in FIG. 3, the light that is output from the grating 304 and is focused by the second lenslet array 307 includes a blue 312, a green 313 and a red 314 spectral component that are focused by the second lenslet array 305 at equally spaced positions on the sensor 307. The advantage of this configuration is that the design of lenslets in the second lenslet array 305 is simpler, and the entire system can be more compact because the dispersed spectrum is symmetrically distributed along its optical axis.

Figure 4:
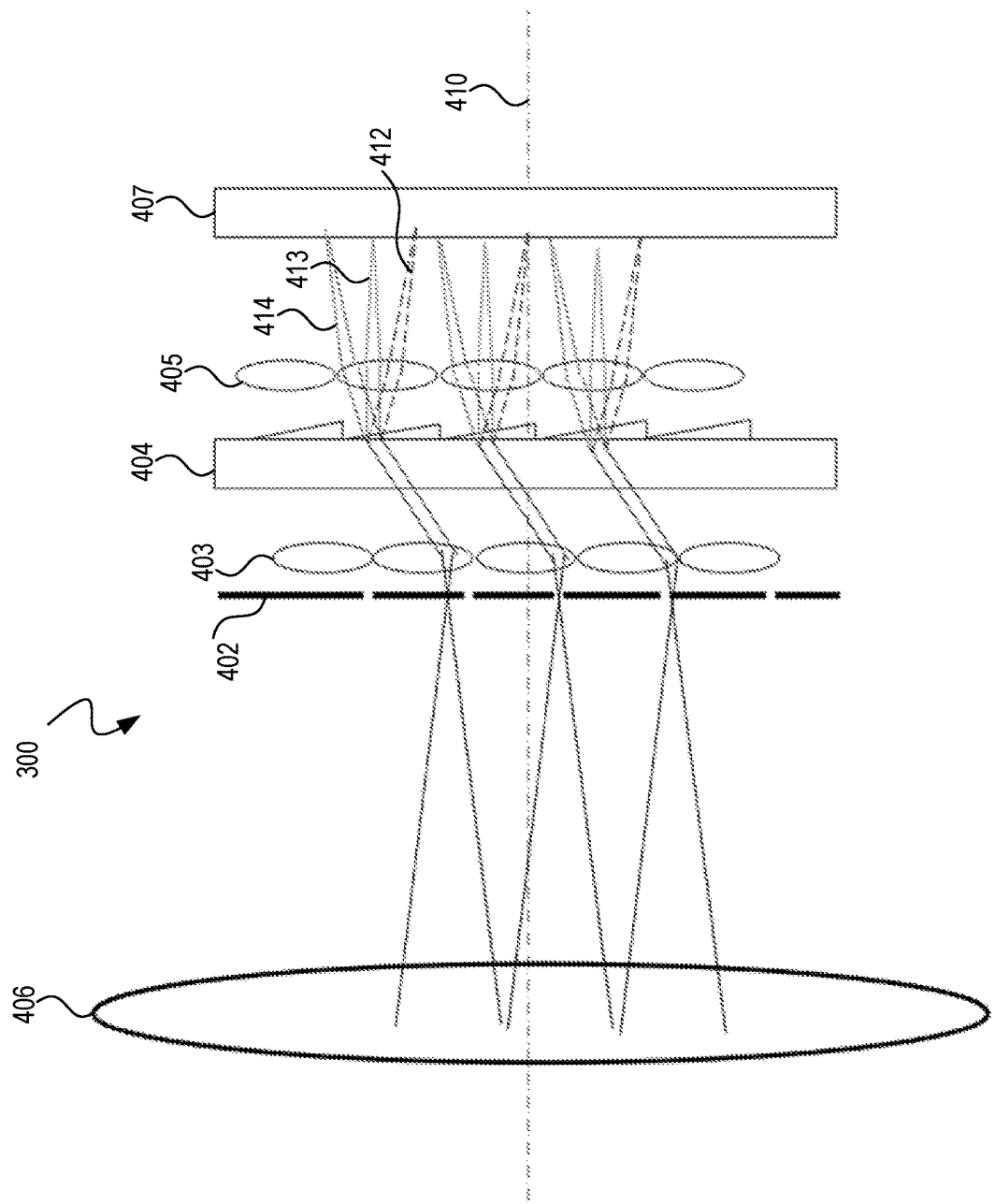
FIG. 4 illustrates another detailed view of a spectral imaging system including a pinhole mask, two lenslet arrays and a prism array in accordance with an exemplary embodiment.

FIG. 4 illustrates another example spectral imaging system 400 that includes similar elements as in FIG. 3, but utilizes a prism array 404 instead of the diffraction grating 304 in FIG. 3. In particular, FIG. 4 illustrates a telecentric lens 406 that is positioned along the optical axis 410, a pinhole mask 402, a first lenslet array 403, and a prism array 404 that includes a plurality of prisms positioned to receive the collimated light from a corresponding lenslet in the first lenslet array 403. The spectrally dispersed light (e.g., blue 412, green 413 and red 414) is focused by the second lenslet array 405 onto the sensor 407.

It should be noted that while, for illustration purposes, only three spectral components of light are shown in FIGS. 3 and 4, different and/or additional spectral bands can be generated in accordance with the disclosed technology. In some embodiments, the light that is output from the dispersion element comprises a contiguous band of spectral components. For example, when the dispersive element is a transmissive diffraction grating, the incident and transmitted light of a particular wavelength are related according to the diffraction grating formula:

$$d(\sin \theta_i - \sin \theta_t) = m\lambda,$$

Where, d is the grating pitch (or distance between grating's slits), $\theta_i$ is the angle of the incident light with respect to the normal to the grating surface, $\theta_t$ is the angle of diffracted light, $\lambda$ is the wavelength of light, and m is an integer corresponding to different diffraction orders (m=0, ±1, ±2, . . . ). It is well understood that a grating can be designed to receive a broad-spectrum light and produce a contiguous band of transmitted wavelengths within, for example, the +1 diffracted order. Similarly, it is well known that a contiguous band of wavelengths can be produced using a prism based on refraction. Accordingly, the dispersive elements of the disclosed system can be properly designed to produce the output spectral bands of desired characteristics for a hyperspectral imaging and detection system.

The systems 200 to 400 that are illustrated in FIGS. 2 to 4 provide examples of a snapshot hyperspectral microspectrometer that includes an aperture (e.g., pinholes) mask component, a first lenslet array, a spectrally dispersive component, and a second lenslet array. The aperture mask is disposed on the object/source side and includes an array of apertures that transmit electromagnetic radiation from the object/source. The first lenslet array is disposed on an image side of the mask, and has a pitch that corresponds to that of the mask apertures. The spectrally dispersive component is disposed on the image side of the first lenslet array. The spectrally dispersive component may be, for example, a prism, a diffraction grating, or other apparatus that will spectrally separate the input to the component and output separate spectral bands. A second lenslet array is disposed on the image side of the spectrally dispersive component. The pitch location of the second lenslet array can be offset from that of the first lenslet array, as needed, to allow the spectral components of the light to be focused or images onto the sensor. As illustrated schematically in FIGS. 2 to 4, an imaging (e.g., telecentric) lens is shown disposed on the object side of the mask and a detector (e.g., CMOS sensor) is disposed on the image side of the spectrally dispersive component. The detector can include, or can be coupled to, analog or digital circuitry, processors and other electronic components that are configured to receive and process the sensed signal from the detector, and produce spectral information regarding the object of interest.

In operation, the imaging lens images the targeted field of view to an intermediate image plane at the aperture mask. At least a portion of the intermediate image is then spatially sampled by the aperture mask (e.g., the pinhole array). The light transmitted by the aperture mask is then collimated by the first lenslet array. The collimated light is then incident upon and dispersed by the spectrally dispersive component to spectrally sample each point in the spatially sampled object field. The spectrally sampled (dispersed) light is then focused onto the sensor by the second lenslet array. Advantageously, the array dimensions of the aperture mask, which provides the spatially sampled object field, are smaller than the pixel array dimensions of the sensor to enable hyperspectral detection. For instance, as shown in the illustrative example of FIG. 3, three spectral components (blue 312, green 313 and blue 314) are produced by each pinhole. Thus, the number of sensor elements must be at least three times the number of pinholes. In other example implementations, a larger (or a smaller) number of dispersed spectral bands may be produced. Yet in other example implementations, the spot size corresponding to each spectral component on the sensor may be captured by more than one sensor element. It is thus evident, that the proper size/number of pinhole apertures, the lenslets and the sensor array can be selected to produce the desired spectral and spatial resolution.

The disclosed devices can be used to enable optical detection methods, and especially method involving a moving object. One exemplary method for the detection of a source (e.g., a gaseous plume) includes the steps of providing an intermediate image of the source to an aperture mask to spatially sample a portion of an object field to be detected, collimating an output of the spatially sampled portion of the object field from the aperture mask, and spectrally sampling the output of the spatially sampled portion of the object field from each aperture of the aperture mask over a plurality of wavelength bands. The method further includes the step of focusing the spectrally sampled output onto a detector.

The disclosed hyperspectral imaging devices can have a small form factor and can be manufactured at a relatively low cost, in-part due to the use of lenslet arrays. In addition, compared to other systems that use bandpass filters and lens arrays, the disclosed systems provide additional features and advantages, including a higher light efficiency, provided in-part because the pinhole array samples the entire light field, multiple spectral bands are produced corresponding to multiple pinholes, and the pinholes operate to reject the light that is not passed through the pinholes. Moreover, the disclosed systems enable spectral analysis with a high resolution; the detected spectral resolution is primarily limited by the spatial resolution of the sensor (e.g., the pitch of the sensor elements).

Figure 5C:
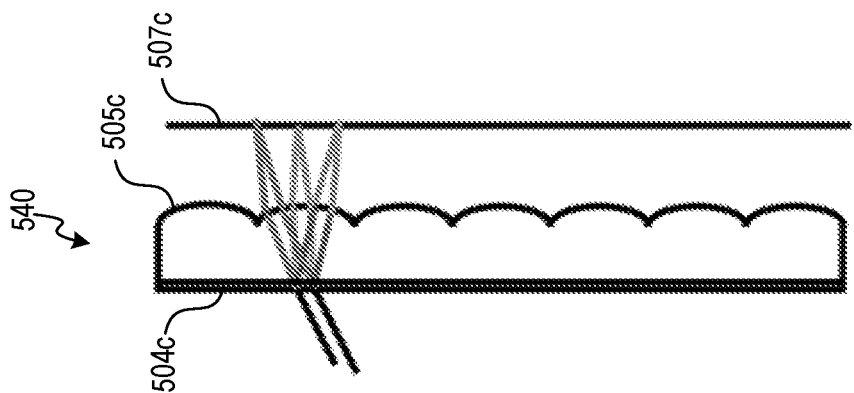
FIG. 5c illustrates a combined dispersive element and lenslet array for implementation in a spectral imaging system in accordance with an exemplary embodiment.
Figure 5B:
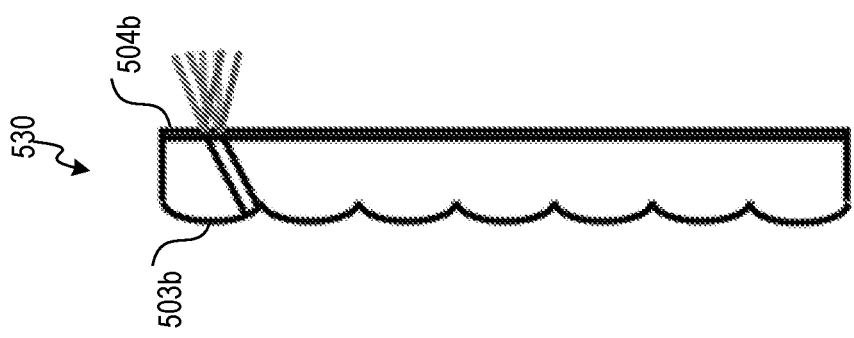
FIG. 5b illustrates a combined lenslet array and dispersive element for implementation in a spectral imaging system in accordance with an exemplary embodiment.
Figure 5A:
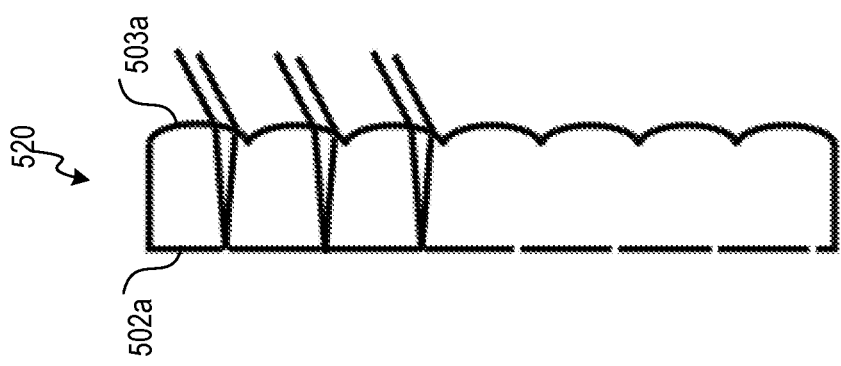
FIG. 5a illustrates a combined pinhole mask and lenslet array for implementation in a spectral imaging system in accordance with an exemplary embodiment.

The robustness and reliability of the disclosed devices can be further improved by combining two or more elements, to eliminate (or reduce) the number of separate components, which in turn improves the overall reliability of the devices, alleviates alignment issues and allows the disclosed devices to be used as part of a moving platform, such as an autonomous vehicle or an unmanned aerial vehicle (UAV). FIGS. 5a, 5b, and 5c schematically illustrate three embodiments in which at least two elements can be combined. In FIG. 5a, the mask and the first lenslet array are combined into a single element. The first surface of the combined element 520 comprises an array of pinholes 502a and the second surface of the combined element 520 comprises a lenslet array 503a to sample the scene and collimate the light. FIG. 5b illustrates another combined element 530, where the first lenslet array and the dispersion element are combined into a single element. The first surface of the combined element 530 comprises a lenslet array 503b and the second surface of the combined element comprises the dispersion element 504b; the collimated light produced by the lenslet array 503b is spectrally dispersed by the dispersion element 504b. FIG. 5c illustrated yet another combined element 540 in which the dispersion element and the second lenslet array are combined into a single element. The first surface of the combined element 540 comprises a dispersion element 504c and the second surface of the combined element 540 comprises the lenslet array 505c. In this configuration, light that is dispensed by the dispersion element 504c is focused by the lenslet array 505c onto the sensor 507c. In some embodiments, a single element is formed (not shown) by combining the mask, the first lenslet array, the dispersion element and the second lenslet array. In such a configuration, the first surface of the single element comprises the mask, the second surface of the single element comprises the second lenslet array, and the first lenslet array and the dispersive optical element are positioned internal to the single element. The four elements can, for example, be cemented together, or otherwise formed as a single optical piece.

It should be noted that in some embodiments, an additional lenslet array may be used, in addition to or instead of, the mask at the entrance to the system. This additional lenslet array operates to focus the light from the scene onto the pinholes to increase light efficiency of the system. In some embodiments, the mask may be removed since the additional lenslet array provides a focused point of light at spatial location where the pinholes would be located.

Accordingly, the disclosed hyperspectral imaging systems can be implemented as an ultra-thin and lightweight system. In some implementations, a total thickness of the system (mask to the second lens array) is less than 10 mm. The lateral dimensions of the system may need to be only slightly larger than the sensing area of the sensor. The disclosed devices and methods provide several advantages and benefits including: 1) an ultra-compact architecture: the hyperspectral system need to only include one mask, two lenslet arrays, and one grating or prism, and can be used in any imaging system by placing it close to the focal plane; 2) ultra-lightweight: the achievable weight of the system may be less than 50 g; 3) ultra-low-cost: the lenslet arrays can be fabricated at a low cost through molding and the grating can be fabricated using replication techniques; 4) robustness and reliability: the four elements (mask, lenslet arrays, and grating/prism) can be assembled into a solid piece such that no moving parts are needed; 5) snapshot imaging capability: the spectral information can be captured in a single shot, insensitive to the motion of the environment; and 6) versatility: the disclosed snapshot hyperspectral imaging system is independent of the sensor and imaging system in that it can be easily placed on top of an existing sensor window, and can be used in existing commercial systems.

It should be noted that while the above described hyperspectral imaging systems have been described as providing snapshot imaging, in some implementations, time evolution of spectral characteristics of the target or object of interest can be measured by taking successive 'snapshots' and processing the data corresponding to obtain the spectral characteristics at different instances in time. Moreover, lenslet array and grating parameters can be modified to accommodate different hyperspectral imaging applications.

Figure 6:
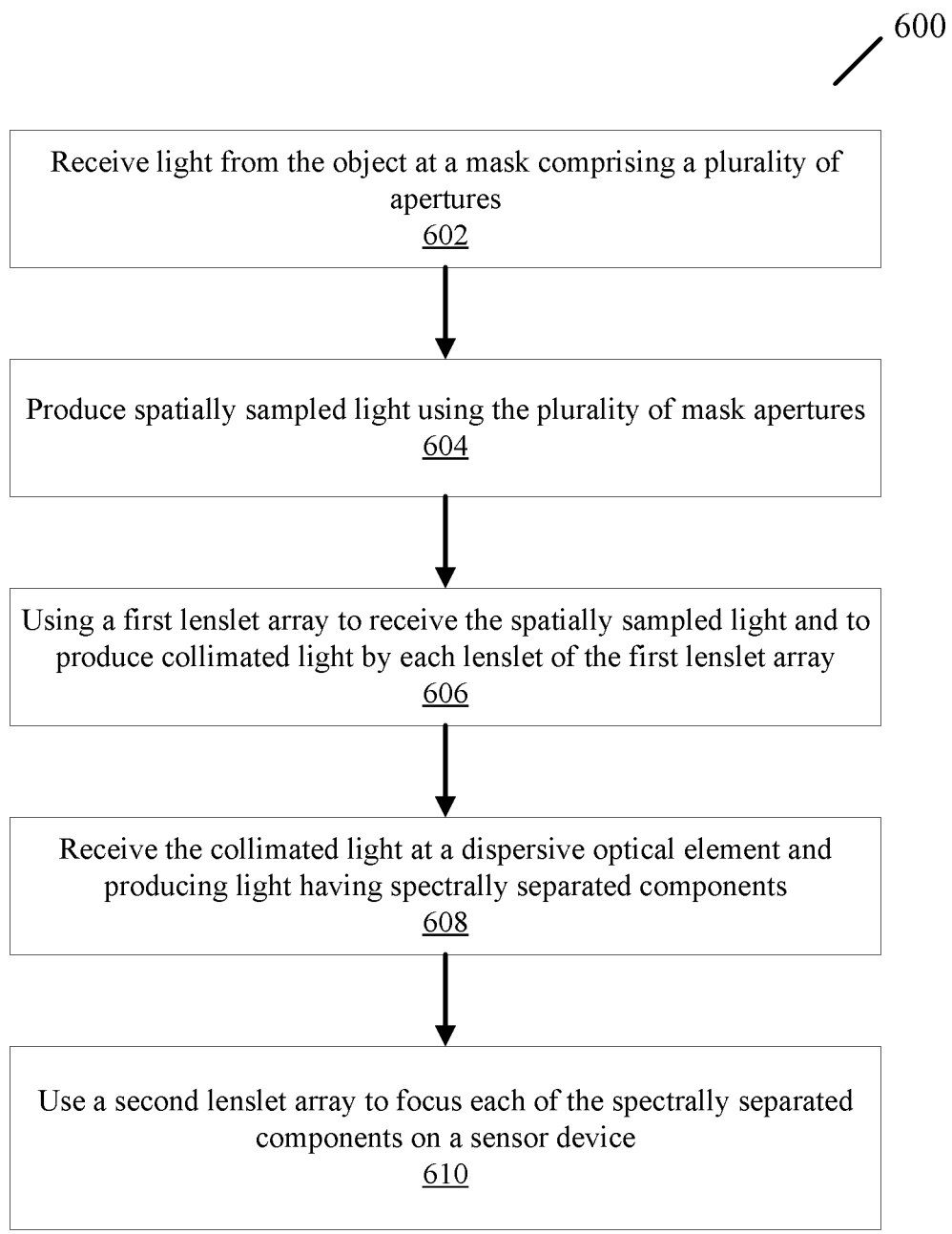
FIG. 6 illustrates a set of operations that can be carried out for sensing spectral components of a received light in accordance with an exemplary embodiment.

FIG. 6 illustrates as set of operations 600 that can be carried out to sense spectral components associated with light received from an object in accordance with an exemplary embodiment. At 602, light from the object is received at a mask that includes a plurality of apertures (e.g., pinholes). At 604, spatially sampled light is produced using the plurality of mask apertures. At 606, using a first lenslet array, the spatially sampled light is received at the first lenslet array, and collimated light is produced by each lenslet of the first lenslet array. At 608, the collimated light is received at a dispersive optical element and light having spectrally separated components is produced. At 610, using a second lenslet array, each of the spectrally separated components is focused on a sensor device. In one exemplary embodiment, the object is in gaseous form. In another exemplary embodiment, the sensor device includes a plurality of sensor elements, and each of the spectrally separated components is focused by the second lenslet array on one or more of the sensor elements. In yet another exemplary embodiment, the spectrally separated components form a contiguous band of wavelengths. In still another exemplary embodiment, the above noted method further includes processing information obtained from the sensor device indicative of detection of the spectrally separated components to determine a characteristic of the object. Such a processing can be carried out using, for example, a processor and a memory comprising instructions or program code stored thereupon, which are communicatively connected to the sensor device. In another exemplary embodiment, the characteristic of the object that is determined by processing the sensor information includes a composition of the object.

In one implementation, a snapshot hyperspectral imaging system that can measure spectral information of light received from a scene is provided that includes a mask to spatially sample the scene, a first lenslet array to collimate the light sampled by the mask, a dispersion element spectrally separating the collimated light to contiguous spectral bands, and second lenslet array to focus the dispersed light onto a sensor. The spectral information can range from ultraviolet to long wave infrared, and the dispersion element can be a diffraction grating, or an array of dispersion prisms. In some embodiments, the mask is an array of transmission pinholes, while in another embodiment, the mask is an array of lenslets. In one embodiment, the total thickness of the system is less than 10 mm. In other example embodiments, various components can be combined. For example, the mask and the first lenslet array can be combined into a single element, where the first surface comprises an array of pinhole and the second surface comprises a lenslet array, to sample the scene and collimate the light. In another example, the first lenslet array and the dispersion element can be combined into a single element, where the first surface comprises a lenslet array and the second surface comprises a dispersion element, to collimate and disperse the light. In yet another example, the dispersion element and the second lenslet array can be combined into a single element, where the first surface comprises a dispersion element and the second surface comprises a lenslet array, to disperse the light and focus the dispersed light onto the sensor.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, and systems.

What is claimed is:

1. A spectral imaging system, comprising:
   a mask comprising a plurality of apertures and positioned to receive light from an object of interest;
   a first lenslet array positioned to receive light that passes through the plurality of apertures, each lenslet of the first lenslet array positioned to receive light from a corresponding aperture of the plurality of apertures and to produce collimated light;
   a dispersive optical element positioned to receive the collimated light from each lenslet of the first lenslet array and to produce light having a plurality of spectrally separated components; and
   a second lenslet array positioned to receive the light having the plurality of spectrally separated components and to focus each of the spectrally separated components onto an image plane, wherein the mask is positioned with respect to the first lenslet array such that each aperture in the mask is laterally offset from a center of a corresponding lenslet in the first lenslet array to cause the collimated light that exits each lenslet of the first lenslet array to impinge upon the dispersive optical element at an oblique angle of incidence.

2. The spectral imaging system of claim 1, wherein each of the plurality of apertures is a pinhole configured to spatially sample the light that is received from the object of interest.

3. The spectral imaging system of claim 2, wherein a diameter of each pinhole is in a range 5 to 10 μm.

4. The spectral imaging system of claim 1, wherein the mask is positioned at a focal plane of the first lenslet array.

5. The spectral imaging system of claim 1, wherein the mask is positioned to produce the oblique angle of incidence on the optical dispersive element such that the light having the plurality of spectrally separated components that is output from the dispersive optical element is symmetrically distributed along an optical axis of each lenslet of the second lenslet array.

6. The spectral imaging system of claim 1, wherein the dispersive optical element comprises a diffraction grating.

7. The spectral imaging system of claim 1, wherein the dispersive optical element comprises an array of prisms.

8. The spectral imaging system of claim 1, further including a sensor positioned at the image plane to receive the spectrally separated components.

9. The spectral imaging system of claim 8, wherein the sensor includes a plurality of pixels, and wherein each of the spectrally separated components is focused onto at least one pixel of the sensor.

10. The spectral imaging system of claim 1, further including a telecentric lens positioned to receive light from the object of interest and to produce an image plane of the telecentric lens at the mask.

11. The spectral imaging system of claim 1, wherein a thickness of the spectral imaging system including the mask, the first lenslet array, the dispersive optical element and the second lenslet array along an optical axis of the spectral imaging system is less than 10 mm.

12. The spectral imaging system of claim 1, wherein a number of lenslets in the first lenslet array, a number of lenslets in the second lenslet array, and a number of apertures in the mask are all equal to one another.

13. The spectral imaging system of claim 1, wherein the mask and the first lenslet array form a single element.

14. The spectral imaging system of claim 1, wherein the first lenslet array and the dispersive optical element form a single element.

15. The spectral imaging system of claim 1, wherein the dispersive optical element and second lenslet array form a single element.

16. The spectral imaging system of claim 1, wherein the mask, the first lenslet array, the dispersive optical element and the second lenslet array form a single element, comprising the mask on a first surface of the single element, the second lenslet array on a second surface of the single element, and the first lenslet array and the dispersive optical element positioned internal to the single element.

17. The spectral imaging system of claim 1, wherein the dispersive optical element is configured to produce the light having a plurality of spectrally separated components that form a contiguous band of wavelengths.

18. The spectral imaging system of claim 1, wherein the spectral imaging system is a hyperspectral imaging system.

19. The spectral imaging system of claim 1, wherein the spectral imaging system is configured as a snapshot imaging system.

20. The spectral imaging system of claim 1, wherein the object of interest is in a gaseous form.

21. A method for sensing spectral components associated with light received from an object, the method comprising:
receiving light from the object at a mask comprising a plurality of apertures;
producing spatially sampled light using the plurality of apertures of the mask;
using a first lenslet array to receive the spatially sampled light and to produce collimated light by each lenslet of the first lenslet array;
receiving the collimated light at a dispersive optical element and producing light having spectrally separated components;
using a second lenslet array to focus each of the spectrally separated components on a sensor device, wherein the mask is positioned with respect to the first lenslet array such that each aperture in the mask is laterally offset from a center of a corresponding lenslet in the first lenslet array causing the collimated light that exits each lenslet of the first lenslet array to impinge upon the dispersive optical element at an oblique angle of incidence.

22. The method of claim 21, wherein the object is in gaseous form.

23. The method of claim 21, wherein the sensor device includes a plurality of sensor elements, and using the second lenslet array to focus each of the spectrally separated components on the sensor device includes focusing each of the spectrally separated components on one or more of the sensor elements.

24. The method of claim 21, wherein the spectrally separated components form a contiguous band of wavelengths.

25. The method of claim 21, further comprising processing information obtained from the sensor device indicative of detection of the spectrally separated components to determine a characteristic of the object.

26. The method of claim 25, wherein the characteristic of the object includes a composition of the object.

* * * * *